W. H. MILLSPAUGH.
SUCTION ROLL FOR PAPER MACHINES.
APPLICATION FILED MAR. 26, 1909.
Reissued Apr. 12, 1910.
13,100.
3 SHEETS—SHEET 1.
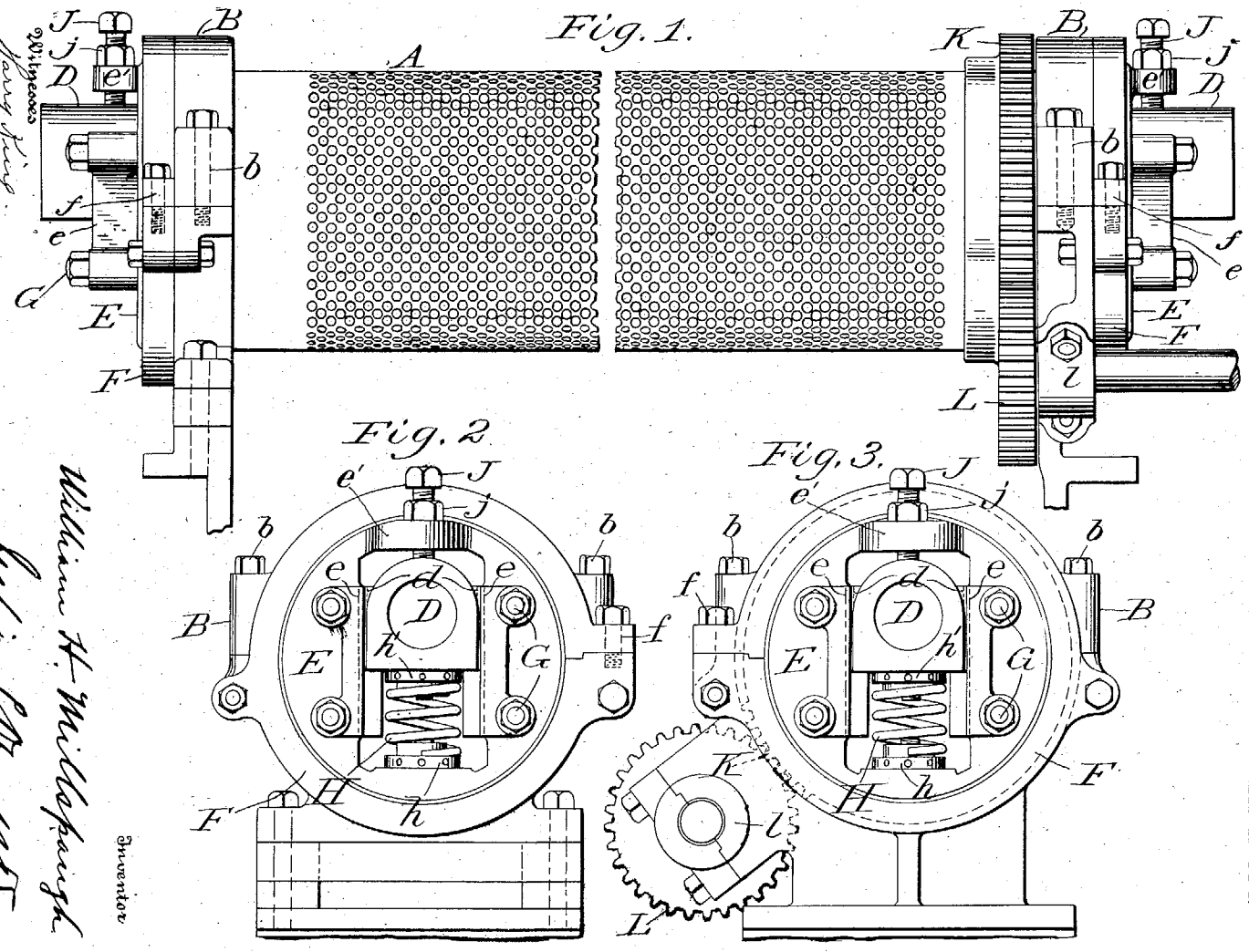
Witnesses
Harry King
Joseph C. Stack.
Inventor
William H. Millspaugh
By Arthur C. Fairbanks Jr.
his Attorneys.

W. H. MILLSPAUGH.
SUCTION ROLL FOR PAPER MACHINES.
APPLICATION FILED MAR. 26, 1909.
Reissued Apr. 12, 1910.
13,100.
3 SHEETS—SHEET 2.
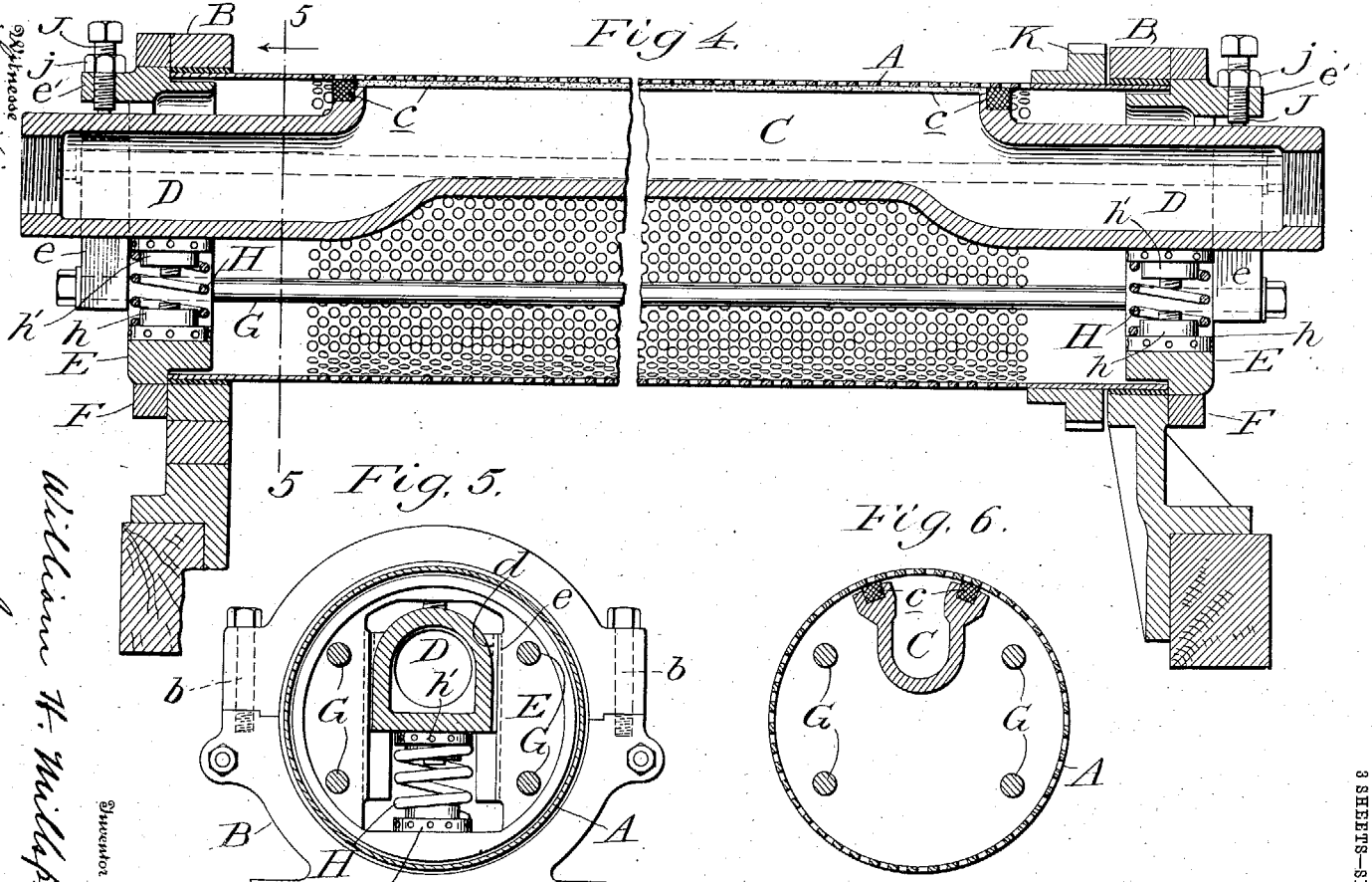
Witnesses
Harry King.
Joseph C. Stack.
Inventor
William H. Millspaugh
By Julian C. Worrell & Son
his Attorneys.

W. H. MILLSPAUGH.
SUCTION ROLL FOR PAPER MACHINES.
APPLICATION FILED MAR. 26, 1909.
Reissued Apr. 12, 1910.
13,100.
3 SHEETS—SHEET 3.
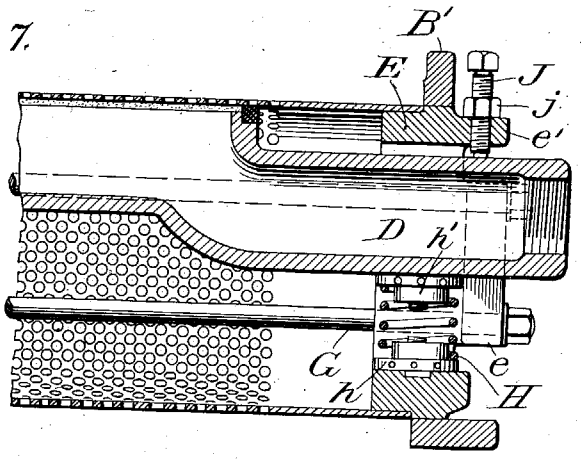
Fig. 7.
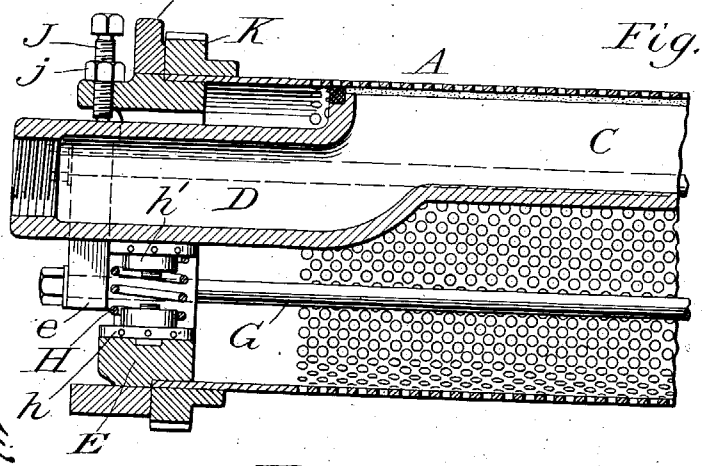
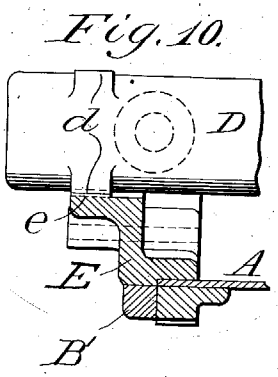
Fig. 10.
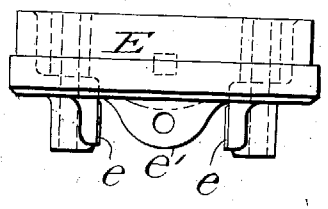
Fig. 9.
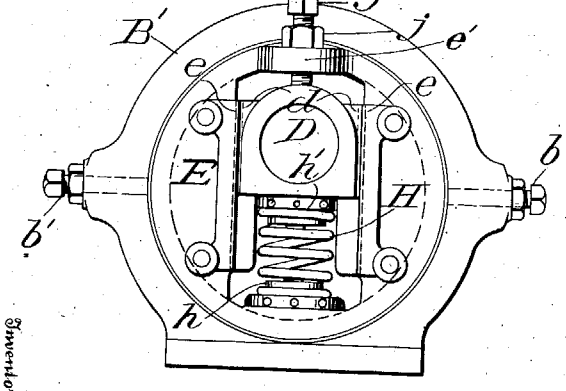
Fig. 8.
Witnesses
Harry King
Joseph C. Stack.
Inventor
William H. Millspaugh
By William C. Stewart Atty
his Attorneys.

UNITED STATES PATENT OFFICE.

WILLIAM H. MILLSPAUGH, OF SANDUSKY, OHIO, ASSIGNOR OF ONE-THIRD TO J. J. DAUCH, ONE-THIRD TO WILLIAM F. HARBRECHT, BOTH OF SANDUSKY, OHIO, AND ONE-THIRD TO FRED. BOERGER, OF DELPHOS, OHIO.

SUCTION-ROLL FOR PAPER-MACHINES.

13,100. Specification of Reissued Letters Patent. Reissued Apr. 12, 1910.

Original No. 895,283, dated August 4, 1908, Serial No. 362,058. Application for reissue filed March 26, 1909. Serial No. 486,039.

*To all whom it may concern:*

Be it known that I, WILLIAM H. MILLSPAUGH, a citizen of the United States, residing at Sandusky, in the county of Erie and State of Ohio, have invented certain new and useful Improvements in Suction-Rolls for Paper-Machines; and I do hereby declare the following to be a full, clear, and exact description of the invention, such as will enable others skilled in the art to which it appertains to make and use the same.

This invention relates to revolving suction-rolls which are employed in paper-making machinery for extracting water and moisture from the paper-pulp while it is forming on an interstitial or porous conveyer, such as the making wire or felt. As the pulp-conveying web passes over or partially around the roll, the latter being perforated or fenestrated, the extraction of moisture is effected by suction or creation of a vacuum inside the roll, which for that purpose contains a non-rotative suction-box or chamber in communication with a vacuum-pump or exhaust apparatus; the open top of said suction-box being in close contact with the interior surface of the roll. Although these suction-rolls, revolving with the same surface speed as that of the pulp-conveying web, possess the advantage of avoiding friction and wear on the wires or tearing of the felts, yet they have not heretofore been brought to a satisfactory degree of perfection, either in mechanical construction or character of operation. A material defect has been the difficulty of maintaining the suction-box in air-tight contact with the roll, so as to effectively utilize the suction, while at the same time obtaining the exact degree of pressure desired and preventing the box from being locked to the roll, especially under influence of a heavy suction or substantial vacuum, which requires additional power to run the roll or cylinder and causes more or less drag and interference with the proper operation of the mechanism. Another usual deficiency in this class of devices has been the lack of convenient means for setting the suction-box at different angular positions in the roll or cylinder, in order to adapt the latter to the line of travel of the pulp-conveying web, which in some machines may pass centrally over the top of the roll, while in others it may pass over or partially around the roll more or less at one side thereof.

The foregoing and other objections are obviated by my present invention, which aims to provide a suction-roll that is mechanically perfect, durable and highly efficient, and having practicable means for securing adjustment of the suction-box both radially and angularly, and for holding said box in perfect air-tight contact with the interior surface of the revolving shell while yet preventing locking of the box to the shell.

The accompanying drawings, which are to be taken as a part of this specification, illustrate two embodiments of my invention, which may also be embodied in other forms and may be modified as to details of construction and arrangement of parts. Without restricting myself, therefore, to these specific illustrated constructions, the invention will hereinafter be fully described with reference to said drawings, and then more particularly pointed out and defined in the appended claims.

Figure 1 of said drawings is a side elevation of a machine embodying my invention, an intermediate portion of the roll being broken away. Fig. 2 is one end view thereof. Fig. 3 is the opposite end view thereof. Fig. 4 is a central longitudinal vertical section of the same. Fig. 5 is a cross-section on line 5—5 of Fig. 4, looking in the direction of the arrow. Fig. 6 is a cross-section through the roll and suction-box. Fig. 7 is a central longitudinal vertical section of another machine embodying my invention. Fig. 8 is an end view thereof. Fig. 9 is a plan view of one of the heads which support the suction-box. Fig. 10 is a central horizontal section through said head, showing the end of the suction-box in plan view.

Referring to Figs. 1 to 6 inclusive, the perforated shell or cylinder A is shown having its imperforate ends revolubly fitted or journaled in annular bearings B, the latter being suitably bushed or lined with hard metal. Said bearings are represented as separable, their upper half-parts or semi-circular sections being mounted and detachably secured, as by screw-bolts *b*, upon the lower half-parts or semicircular sections, which latter are or may be constructed as supporting brackets for the roll.

Within the shell or cylinder is the longitudinally-disposed suction-box C, the open top of which conforms to the curvature of and fits closely against the interior surface of the shell, at the upper side thereof; there being a packing strip or strips *c* seated in a groove or rabbet entirely surrounding said open top, to take the wear and form an air-tight juncture with the surface of the shell, as usual in devices of this class. The suction-box C proper has tubular ends D, constructed or formed lower than the medial open-topped portion of the box, which alone bears against the interior surface of the cylinder. One or both of said ends D, preferably both, is or are adapted for communication with a suction-pump or other exhaust apparatus; the extremities of said ends D being shown longitudinally threaded for coupling to pipe connections with said pump.

At opposite sides of the cylinder are circular heads E, in which the ends D of the suction-box are spring-supported as hereinafter described, allowing the necessary radial play or motion of the box to adjust the pressure with which it bears against the interior surface of the shell. Said heads E are stationary, but are adapted to be adjusted angularly, being secured in clamp-rings F, which latter are rigidly attached by screw-bolts or studs to the sides of the bearings or annular brackets B. On loosening the clamp-bolts or studs *f*, the two heads E can be turned in the clamp-rings to set the suction-box C at any desired angular position, according to the line of travel of the pulp-conveying web, as the making wire or felt, which passes over or partially around the roll or cylinder. Longitudinal tie-rods G connect the opposite heads and make them a rigid structure, so that they are adjustable in unison.

The heads E are provided, along diametrical openings or ways therein, with parallel guides *e*, made preferably on the outer sides of the heads; and the ends D of the suction-box, extending through said openings, are slidably fitted between said guides *e*; the latter being faced with brass or other appropriate material, and the box-ends D between the guides being constructed or provided with flat side-plates or facings *d* of similar metal or material, to preserve a smooth sliding bearing and prevent rust and consequent locking of the box in the guides. In said head E, under the ends D of the suction-box, are mounted stout coil springs H, which lift up the box and yieldingly but forcibly support it with its open face in contact with the interior surface of the cylinder A. Said springs are shown seated on bosses *h* in the lower parts of the heads, and having their upper ends fitted to bosses *h'* on the bottoms of the ends of the suction-box; and, to permit adjusting the tension or pressure of the springs, said bosses *h*, *h'* may comprise flanged nuts tapped on threaded studs, whereby the nuts may be adjusted to contract or distend the springs, as desired. The upward lift of the suction-box is limited by adjustable stops J consisting of set-screws, one at each end of the roll, tapped through projections *e'* on the outer sides of the heads E, above the ends D of the box and bearing on the latter; the said set-screws being secured by lock-nuts *j*. It will thus be seen that the suction-box, having its ends alined in the guides *e*, is assured a perfectly radial play or motion; and, the box being constantly forced upward by the power of its supporting springs H, its open top is at all times held positively in air-tight contact with the interior surface of the roll or cylinder, thus preventing liability of leakage or waste or destruction of the vacuum, and insuring the effective utilization of the suction; while, at the same time, the vacuum is prevented from unduly lifting the box and locking it to the shell, and the bearing pressure of the box against the shell is easily regulated, all adjustments necessary being made by the two set-screws J, which may be manipulated by a common wrench.

In view of the foregoing, the roll may be operated as safely as and with no more trouble than an ordinary press-roll; no more air need be removed from the roll than passes through the paper and felt, which means that the pump may be of moderate size; and it is entirely practicable to maintain a vacuum such as necessary to secure maximum working results, without requiring excessive power to run the machine. In addition to these advantages, the roll accomplishes an improved grade of work, enabling the operator to obtain dry felts and paper for delivery to the presses, and a sheet more free from felt marks, and thicker by gage if pressed to the same dryness and delivered to driers at the same percentage of dryness as with old methods, or a sheet drier when delivered to driers at the same thickness as with old methods, thereby lessening the amount of steam used to finish, or, if same steam be used, securing greater speed and production. Numerous minor advantages appear in the operation of the machines.

For driving the roll or cylinder A, it is shown in Figs. 1 and 3 provided with a gear K in mesh with a pinion L, the shaft of which pinion is journaled in a box *l* therefor constructed on or as a part of one of the annular bearing brackets B.

The machine shown in Figs. 7 and 8 is substantially similar to that already described, except in the following particulars. In this embodiment of my invention, the separate clamp-rings (indicated by the letter F in Figs. 1 to 6 inclusive) are dispensed with, and the heads E, which support the suction-box are mounted in annular brackets or standards B′, and are secured in fixed position therein by means of set-screws *b*′, which of course permit angular adjustment of the heads in order to set the box at different angular positions. In this case, the shell or cylinder A may be revolubly journaled on or in the brackets B′, or on the heads E, the latter construction being shown, that is the ends of the cylinder are shown revolubly fitted on inward flanges on the said heads E.

I claim as my invention and desire to secure by Letters Patent:—

1. In a suction-roll, the combination with the revoluble perforated cylinder and suction-box therein, of means yieldingly forcing said box in contact with the interior surface of said cylinder, and means limiting the lift of said box toward said surface.

2. In a suction-roll, the combination with the revoluble perforated cylinder and suction-box therein, of means yieldingly forcing said box in contact with the interior surface of said cylinder, and adjustable stops limiting the lift of said box toward said surface and affording regulation of the contact of said box with said surface.

3. In a suction-roll, the combination with the revoluble perforated cylinder and suction-box therein, of means yieldingly supporting said box and thereby maintaining it in contact with the interior surface of said cylinder, and means operating in opposition to said supporting means for regulating the bearing pressure of the box upon said surface.

4. In a suction-roll, the combination with the revoluble perforated cylinder and suction-box therein, of means supporting or forcing said box in contact with the interior surface of said cylinder, and stops arranged to limit the lift of said box and prevent locking thereof to said surface under influence of the vacuum or suction.

5. In a suction-roll, the combination with the revoluble perforated cylinder and suction-box therein, of stationary heads having radial or diametrical guides in which the ends of the box are slidably-fitted, spring-supports for said box located under the ends thereof in said heads, thereby forcing the open top of the box in contact with the interior surface of said cylinder, and set-screws carried by said heads above the ends of the box and bearing thereon, thereby affording adjustable means for limiting the lift of said box toward said surface.

6. In a suction-box, the combination of the revoluble perforated cylinder having stationary heads, a longitudinal suction-box therein having an open-topped portion in contact with the interior surface of said cylinder and having tubular portions extending through diametrical or radial ways or openings in said heads, spring-supports mounted in said heads under and bearing up the ends of said box, and projections on said heads above the ends of the box and set-screws tapped therethrough limiting the lift of the box.

7. In a suction-box, the combination of the revoluble perforated cylinder and suction-box therein, the latter being radially adjustable and having means forcing it in contact with the interior surface of said cylinder, and stationary guideways for the ends of said box in which the latter are slidably-fitted, said guide-ways and the contacting sides of the ends of the box having non-corrosive facings to prevent rust and locking of the box in said guideways.

8. In a suction-roll, the combination of the revoluble perforated roll and suction-box therein, of stationary heads supporting the ends of said box, springs carried by said heads and bearing up the box, and set-screws tapped through ears on said heads and bearing upon the box.

9. In a suction-roll, the combination with a revoluble perforated cylinder and suction-box therein, of spring-supporting means for said box holding its open top in contact with the interior surface of the cylinder, guides for said box arranged to permit relative movement thereof radially of said cylinder, and adjustable stops limiting the pressure or lift of said box against said cylinder.

10. In a suction-roll, the combination with the revoluble perforated cylinder, of stationary but angularly-adjustable heads, a longitudinal suction-box within said cylinder and supported by said heads, means whereby said box can be set at different angular positions in said cylinder and in contact with the interior surface thereof, and means carried by said heads for adjusting said box in relation to its bearing on the interior surface of said cylinder.

11. In a suction-roll, the combination with the revoluble perforated cylinder, of a non-rotative suction-box therein, stationary heads in which the ends of said box are movably supported, means bearing said box in contact with the interior surface of said cylinder, bearings or supports for said heads in which the latter are angularly adjustable, and means for fixedly securing said heads in said bearings or supports.

12. In a suction-roll, the combination with the revoluble perforated cylinder, of a non-rotative suction-box therein, stationary heads in which the ends of said box are movably supported, means bearing said box in contact with the interior surface of said cylinder, bearings or supports for said heads in which the latter are angularly adjustable, and means for fixedly securing said heads in said bearings or supports, and tie-rods connecting said heads and causing them to be adjustable only in unison.

13. In a suction-roll, the combination of annular brackets, heads fixedly-secured but angularly adjustable therein, a revoluble perforated cylinder having its ends journaled in or on annular bearings provided by the aforesaid elements, and a longitudinal suction-box therein having its ends movably-supported by said heads, and means bearing said box against the interior surface of said cylinder.

14. In a suction-roll, the combination of a revoluble perforated cylinder, annular bearings for the ends of said cylinder, clamp-rings secured to the sides of said bearings, stationary heads secured in said clamp-rings and angularly adjustable therein, and a suction-box in said cylinder supported by said heads.

15. In a suction-roll, the combination of a revoluble perforated cylinder, stationary heads therefor, means for angularly adjusting said heads, annular bearings for the ends of said cylinder rigid with said heads, and a suction-box within the cylinder supported by said heads.

16. In a suction-roll, the combination of the revoluble perforated cylinder and suction-box therein, one of which is relatively movable and bears against the other to maintain contact between the face of the suction-box and the interior surface of the cylinder, and limiting means withholding the movable member to limit the pressure of such contact.

17. In a suction-roll, the combination of the revoluble perforated cylinder and suction-box therein, one of which is relatively movable and bears against the other to maintain contact between the face of the suction-box and the interior surface of the cylinder, and adjustable devices withholding the suction-box and cylinder from contact beyond a predetermined pressure and adapted for regulating the permitted bearing pressure as required.

18. In a suction-roll, the combination of the revoluble perforated cylinder and suction-box therein, one of which bears yieldingly against the other to maintain contact between the face of the suction-box and the interior surface of the cylinder, and limiting means restraining the yieldingly bearing member to withhold it from bearing upon the other beyond a predetermined pressure.

19. In a suction-roll, the combination with the revoluble perforated cylinder and suction-box therein, one bearing yieldingly against the other to maintain contact between the face of the suction-box and the interior surface of the cylinder, of adjustable limiting means withholding the yieldingly bearing member to limit the pressure of such contact and regulate the permitted bearing pressure as required.

20. In a suction-roll, the combination with the revoluble perforated cylinder and suction-box therein, of means yieldingly holding one against the other to maintain contact between the face of the suction-box and the interior surface of the cylinder, and adjustable stop means to limit the pressure of such contact between the two members as required.

21. In a suction-roll, the combination with the revoluble perforated cylinder and suction-box therein in contact with the interior surface of said cylinder, one bearing yieldably against the other to maintain such contact, and stops limiting radial play of one toward the other and thereby limiting the pressure of such contact.

22. In a suction-roll, the combination of the revoluble perforated cylinder and suction-box therein, one bearing against the other to maintain contact between the suction-box and the interior surface of the cylinder, non-rotating heads to which the ends of the cylinder are revolubly fitted, said heads and the box having coacting guides for the relative movement between the box and cylinder, and adjustable stops carried by said heads which withhold the box and cylinder from contact beyond a limited pressure.

23. In a suction-roll, the combination of the revolving perforated cylinder and suction-box therein, one bearing against the other to maintain contact between the box and interior surface of the cylinder, non-rotating members or heads rigid with the cylinder bearings and having guides arranged upon chords parallel to a median radial line for the box, and stops carried by said members to limit the bearing pressure between the box and cylinder.

24. In a suction-roll, the combination with the revoluble perforated cylinder and suction-box therein, of means supporting said box in contact with the interior surface of the cylinder, said supporting means allowing relative radial adjustment between the box and said surface, non-rotating heads concentric with the cylinder and constituting guides for such relative radial adjustment, and adjusting screws operating between said heads and the box to limit the pressure of contact.

25. In a suction-box, the combination with the revoluble perforated cylinder and suction-box therein, of non-rotating cylinder heads, means operating between said box and heads forcing the box and interior surface of said cylinder in contact, and means operating in the opposite direction between said box and heads to limit the pressure of such contact.

26. In a suction-box, the combination with the revoluble perforated cylinder having non-rotating heads, of a suction-box therein, said heads being provided with radial guides for said box, springs operating between said box and heads whereby the box and interior of said cylinder are yieldingly forced in contact, and devices acting between said box and heads in opposition to said springs to limit the pressure of such contact.

27. In a suction-roll, the combination with the revoluble perforated cylinder and suction-box therein, of supports for the box holding it in contact with the interior surface of the cylinder, non-rotating heads concentric with the cylinder and constituting guides for relative radial movement between the box and cylinder, said heads together with the box supports being angularly adjustable to set the box at different positions in the cylinder without affecting the radial adjustment, and means operating between said heads and the box for regulating the bearing pressure between the box and interior surface of the cylinder.

In testimony whereof I affix my signature in presence of two witnesses.

WILLIAM H. MILLSPAUGH.

Witnesses:
A. S. Loomis,
W. H. H. Young.